UNITED STATES PATENT OFFICE.

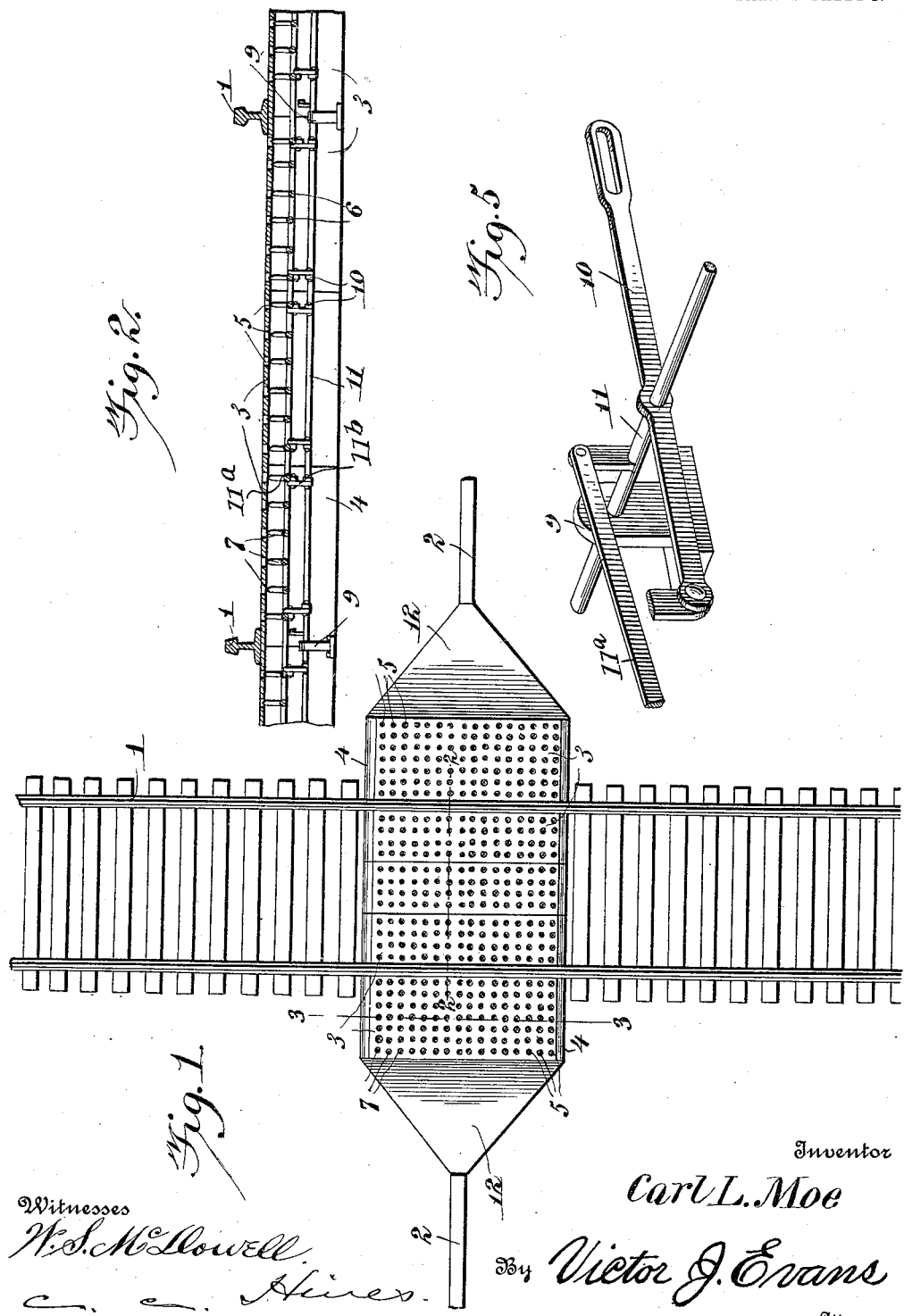

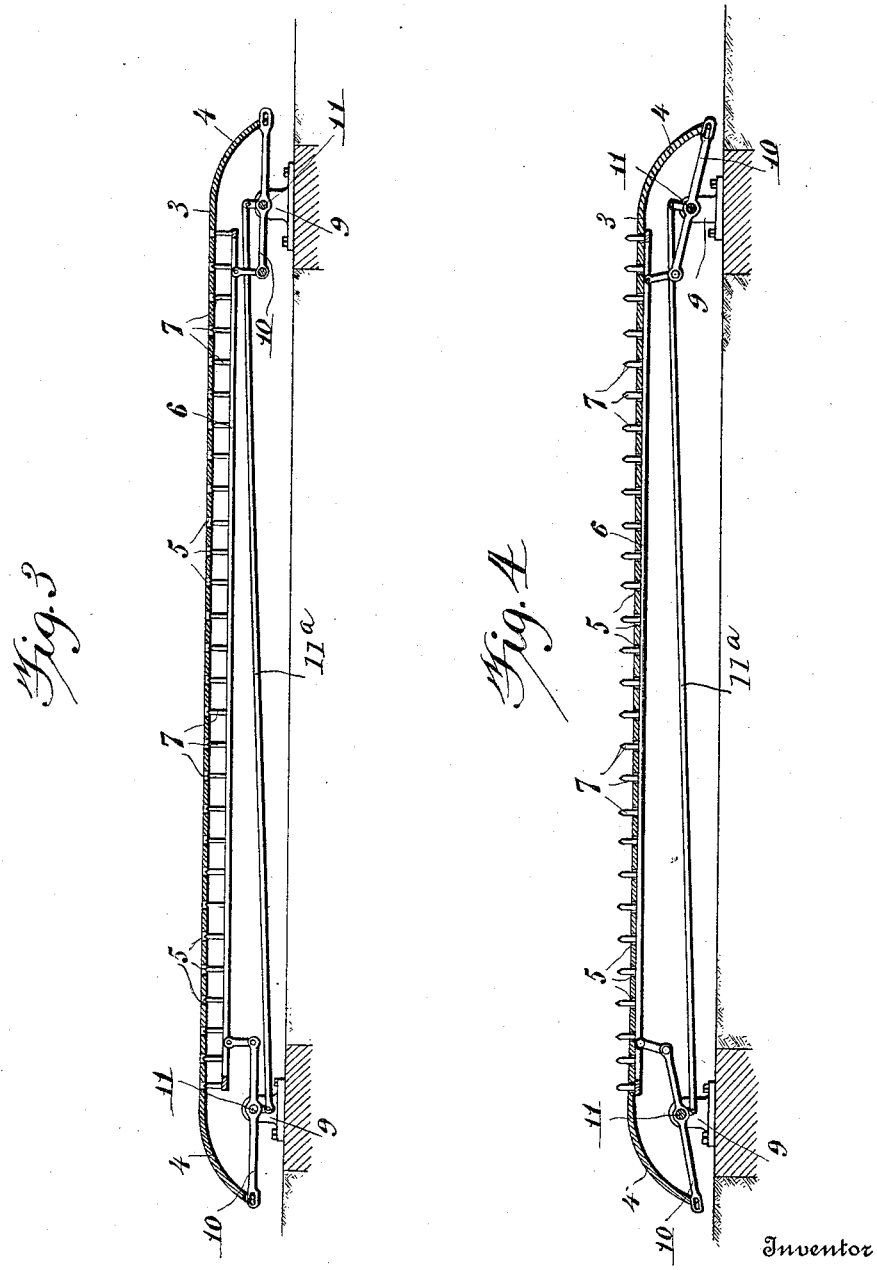

CARL LUND MOE, OF PORTER, WASHINGTON.

CATTLE-GUARD.

1,052,265.  Specification of Letters Patent.  Patented Feb. 4, 1913.

Application filed June 8, 1912. Serial No. 702,548.

*To all whom it may concern:*

Be it known that I, CARL L. MOE, a citizen of the United States, residing at Porter, in the county of Chehalis and State of Washington, have invented new and useful Improvements in Cattle-Guards, of which the following is a specification.

This invention relates to cattle guards, the object of the invention being to provide a simple, reliable and effective device of this character adapted to deter cattle from passing over a railroad track or other dangerous point, and which embodies one or more depressible platforms having openings therein and means arranged below the platform for the projection of guard spikes or spurs through the openings when a cow steps upon and depresses the platform.

A further object of the invention is to provide means for preventing weeds, trash or other foreign matter from being blown under the platform and interfering with the operation thereof.

The invention consists of the features of construction, combination and arrangement of parts hereinafter fully described and claimed, reference being had to the accompanying drawings, in which—

Figure 1 is a top plan view showing the device arranged in juxtaposition to the rails of a railroad track. Fig. 2 is a sectional view on the line 2—2 of Fig. 1. Fig. 3 is a sectional view on the line 3—3 of Fig. 1, through one of the platform sections, showing the parts in normal position. Fig. 4 is a similar view showing the platform section depressed and the coacting spurs or spikes projected therethrough. Fig. 5 is a fragmentary perspective view of one of the rock shafts and its lever connections.

Referring to the drawings, 1 designates the rails of a track, and 2 the usual guard fence. The guard comprises a series of independently depressible platform sections 3, of which one or more are placed between the track rails, and others on the outer sides of the rails. These platform sections may be made of wood, metal, or a composite structure, as desired, and each of said platform sections is provided at its opposite ends with depending flanges 4. Each platform section is further provided with any desired number and arrangement of openings 5, for a purpose hereinafter described.

Extending longitudinally beneath each platform section is a series of bars or rods 6, connected for movement in unison, and forming a skeleton framework. The individual bars of this skeleton framework are provided with spikes or spurs 7, preferably arranged in longitudinal rows. These rows of spikes normally lie below the plane of the platform in registry with the rows of openings 5, and are adapted to be projected upwardly through said platform when the latter is depressed.

Secured to the ties beneath the ends of the platform sections are fulcrum blocks 9 on which are centrally pivoted rocking levers 10, said levers being connected with transverse rods or shafts 11 carried by said fulcrum bars, which shafts are coupled for movement in unison by link bars 11$^a$ pivotally engaging the crank arms 11$^b$ on the shafts. The outer ends of these levers are pivotally connected by links with the flanges 4 of the platform section, while the inner ends of said levers are pivotally connected with the skeleton framework. By this construction, it will be apparent that when a cow steps upon any of the platform sections, the latter will be depressed and motion will be transmitted from the levers to the skeleton frame, thus projecting the guard spurs or spikes 7 upwardly through the openings 5 in the platform section, thus deterring or preventing the cow from crossing the track.

Arranged between the outer platform sections 3 and the portions of the fence 2 on opposite sides of the track are fenders 12 which cover the space between the sides of the outer platform sections and the ground, and thus, to a large extent, prevent foreign material from being blown beneath the platforms and interfering with the operation of the guard sections. These fenders further prevent cattle from getting their legs caught beneath the outer guard sections, and also prevent small animals from passing beneath the same.

It will be understood, of course, that any suitable number of platform sections may be employed, and it will be seen that the invention provides a simple, reliable and effective device for the purpose stated.

I claim:—

1. A cattle guard embodying a depressible platform having openings therein, a frame arranged beneath the platform and carrying projections arranged in line with the openings, and means operative when the platform is depressed to elevate said projections.

2. A cattle guard embodying a depressible platform having openings therein, a frame disposed beneath the platform and carrying projections adapted to move through said openings, and levers pivotally connecting the platform and frame, whereby upon the depression of the platform the frame will be elevated.

3. A cattle guard embodying a depressible platform having openings therein, a frame disposed beneath the platform and having projections adapted to pass through said openings, and levers pivotally connected at one end with the platform and at their opposite ends with the frame and adapted when the platform is depressed to transmit upward motion to the frame.

4. A cattle guard embodying a platform having openings therein and depending end flanges, fulcrum blocks, a frame disposed beneath the platform and having projections adapted to pass upward through the openings therein, and levers fulcrumed on said blocks, said levers being pivoted at their outer ends to the flanges of the platform and at their inner ends to the frame, whereby when the platform is depressed the levers will be operated to elevate the frame.

5. The combination with the rails of a track, of a guard comprising a series of depressible platforms arranged between the rails and on the outer sides of said rails, said platforms having openings therein, frames disposed beneath the platforms and having projections adapted to pass upward through said openings, and a lever mechanism operated by the depression of each platform for transferring upward motion to the associated frame.

6. The combination with a railroad track, of depressible platforms arranged between the rails of the track and at opposite sides of said rails, said platforms having openings therein, and each of said platforms being provided with depending end flanges, fenders closing the spaces between the outer sides of the outer platforms and the ground surface, frames disposed beneath each platform and having spurs adapted to be projected upward through the openings therein, and levers supporting the platform and frame and adapted upon the depression of the platform to project the frame upward.

In testimony whereof I affix my signature in presence of two witnesses.

CARL LUND MOE.

Witnesses:
W. L. Cox,
Sam McMaster.